US006109030A

United States Patent [19]

Geringer

[11] Patent Number: 6,109,030

[45] Date of Patent: Aug. 29, 2000

[54] APPARATUS AND METHOD FOR GANGING MULTIPLE OPEN CIRCUIT PUMPS

[75] Inventor: Kerry G. Geringer, Ames, Iowa

[73] Assignee: Sauer Inc., Ames, Iowa

[21] Appl. No.: 09/023,737

[22] Filed: Feb. 13, 1998

[51] Int. Cl.[7] .......... F16D 31/02

[52] U.S. Cl. .......... 60/430; 60/452

[58] Field of Search .......... 60/430, 452

[56] References Cited

U.S. PATENT DOCUMENTS

| | | | |
|---|---|---|---|
| 2,924,940 | 2/1960 | Covert et al. | 60/430 |
| 3,695,783 | 10/1972 | Soyland et al. . | |
| 3,723,026 | 3/1973 | Soyland et al. . | |
| 3,732,036 | 5/1973 | Busbey et al. . | |
| 3,767,327 | 10/1973 | Wagenseil . | |
| 3,971,216 | 7/1976 | Miller | 60/452 |
| 3,999,892 | 12/1976 | Hein . | |
| 4,455,124 | 6/1984 | Born et al. . | |
| 4,561,249 | 12/1985 | Watanabe et al. . | |
| 4,745,747 | 5/1988 | Krausse et al. | 60/452 |
| 4,880,359 | 11/1989 | Hoffmeister et al. . | |
| 5,226,289 | 7/1993 | Krebs | 60/430 |
| 5,333,997 | 8/1994 | Hormann et al. . | |
| 5,673,557 | 10/1997 | Yoshida et al. | 60/430 |

*Primary Examiner*—F. Daniel Lopez
*Attorney, Agent, or Firm*—Zarley, McKee, Thomte, Voorhees & Sease

[57] ABSTRACT

A ganged pumping apparatus includes first and second variable displacement open circuit pumps, each having a load sensing control and a servo actuator together for changing the fluid displacement of each pump respectively. The load sensing controls being adjusted so that the setting of the control on the second pump is lower than the setting of the control on the first pump. The servo actuator of the first pump having over-center capability, allowing the first pump to operate with negative fluid displacement, and the servo actuator of the second pump having a stop to limit minimum displacement to non-negative or zero displacement. A single pressure compensating pilot valve disposed in the first pump provides the pressure compensation function of both pumps. A pilot signal line interconnects the pressure compensating pilot valve, the load sensing controls, and a load such that the flow output of the pumps is combinable into a single output and functions as a single large displacement pump. A method of ganging and phasing the pumps is also disclosed.

18 Claims, 3 Drawing Sheets

10
12
14
16
18
19
20
24
26
28
30
30A
32
33
34
35
36
37
38
40
42
43
44
45
48
50
52
54
55
56
58
X

APPARATUS AND METHOD FOR GANGING MULTIPLE OPEN CIRCUIT PUMPS

BACKGROUND OF THE INVENTION

The present invention relates to the field of hydraulic pumps. More particularly, the invention relates to an apparatus and method for ganging multiple open circuit variable displacement pumps.

Many applications of open circuit variable pumps may require large displacements, but still desire the size advantages (height, width and sometimes length) of smaller displacement units. Conventional multiple open circuit pumps comprise a plurality of smaller pumps ganged together by connecting their output lines into a single combined output line to provide pressurized fluid to a load. Combined multiple pumps offer the advantage of higher filling speeds and lower cost. Two or more units can be combined to operate as a single larger unit, but control of the combined unit has been problematic. Undesirable interactions often occur between the individual units. The functional characteristics typical of an individual unit are generally compromised. An apparatus and a method for combining multiple pumps while maintaining the functional characteristics of the individual units are needed.

Variable displacement open circuit pumps supply a unidirectional flow of pressurized fluid for driving working devices under load, such as hydraulic motors or cylinders. Various mechanisms are incorporated to control the flow and pressure of fluid from the pump in response to varying operating load requirements. One such mechanism is a load sensing control that varies the fluid displacement of the pump in a manner that provides the flow to the working device as determined by the flow command typically set by the system operator.

Another design feature of variable displacement open circuit pumps is the ability to operate in an over-center condition. When operating in the over-center condition, the pump consumes rather than supplies fluid flow. This over-center operating condition serves to accommodate oil that is "stored" in the load circuit during transient flow conditions due to the compression and containment of fluid within the pump output line.

In a conventional multiple ganged pump system, more particularly in a two variable displacement open circuit pump system, an undesirable fluid circulation pattern may occur when one pump operates in the over-center condition and the other pump continues to operate with a positive fluid displacement with its output flow going to the over-center pump. Overall there is no net output flow, however fluid is flowing in a recirculation pattern between the two pumps. This recirculating flow only serves to needlessly waste energy and generate heat in the system.

When ganging multiple variable displacement open circuit pumps for the purpose of combined flow, it is necessary to incorporate modifications to the otherwise standard load sensing control and over-center function to enable the pumps to interact compatibly and function in a manner equivalent to a single large displacement pump.

Therefore, a primary objective of the present invention is the provision of an improved means and method of ganging multiple open circuit pumps so as to provide control functions which closely emulate those of a single pump.

A further objective of this invention is the provision of a control system for multiple ganged open circuit pumps which reduces the problems associated with over-center operation, while maintaining operative stability.

A further objective of this invention is the provision of a gang of open circuit pumps wherein the pumps operate at a no-flow standby condition by maintaining different pressure settings in their respective load sensing controls.

A further objective of this invention is the provision of a gang of open circuit pumps wherein only one pump has over-center capability while all of the remaining pumps that are ganged together have a zero degree stop to prevent them from operating over-center.

These and other objectives will be apparent from the drawings, as well as from the description and claims which follow.

SUMMARY OF THE INVENTION

The present invention relates to a ganged pumping apparatus including a plurality of variable displacement open circuit pumps which draw and pressurize fluid from a reservoir.

A ganged pumping apparatus includes first and second variable displacement open circuit pumps. The ganged pumping apparatus draws fluid from a reservoir. The pumps pressurize the fluid to be subsequently supplied to drive a load device. The first and second pumps each have an output line. The respective output lines are joined into a single common line that is connected to a load through a flow control valve. Each of the pumps has a swashplate for varying its displacement.

The first pump has an over-center servo actuator connected to its swashplate and a load sensing control, as well as an adjustable pressure compensating pilot valve connected to the load with a pilot signal line. The load sensing control has one end fluidly connected to the output line and the other end fluidly connected to the pilot signal line. The second pump has a load sensing control and its own servo actuator operatively connected to its swashplate. The load sensing control of the second pump is fluidly connected at one end to the output line and at the other end to the pilot signal line via a conduit connecting the two pumps.

In the preferred embodiment, the second pump maintains a zero fluid displacement (not over-center) at the standby condition while the first pump is capable of operating over-center to accommodate transient flow conditions. Undesirable flow recirculation between the two pumps is thus avoided. In order to achieve this desired flow relationship between the two pumps, an offset is introduced between the pumps by utilizing an adjustable load sensing control in at least the second pump, so that the setting of the control of the second pump can be set below the load sensing control setting of the first pump. As a result, the pumps will perform like a single larger pump, without the adverse interaction that is typically experienced in ganged pumping systems that do not incorporate the beneficial configuration of this invention.

A method of ganging multiple pumps together is also disclosed.

DETAILED DESCRIPTION OF THE PREFERRED EMBODIMENT

Figure 1:
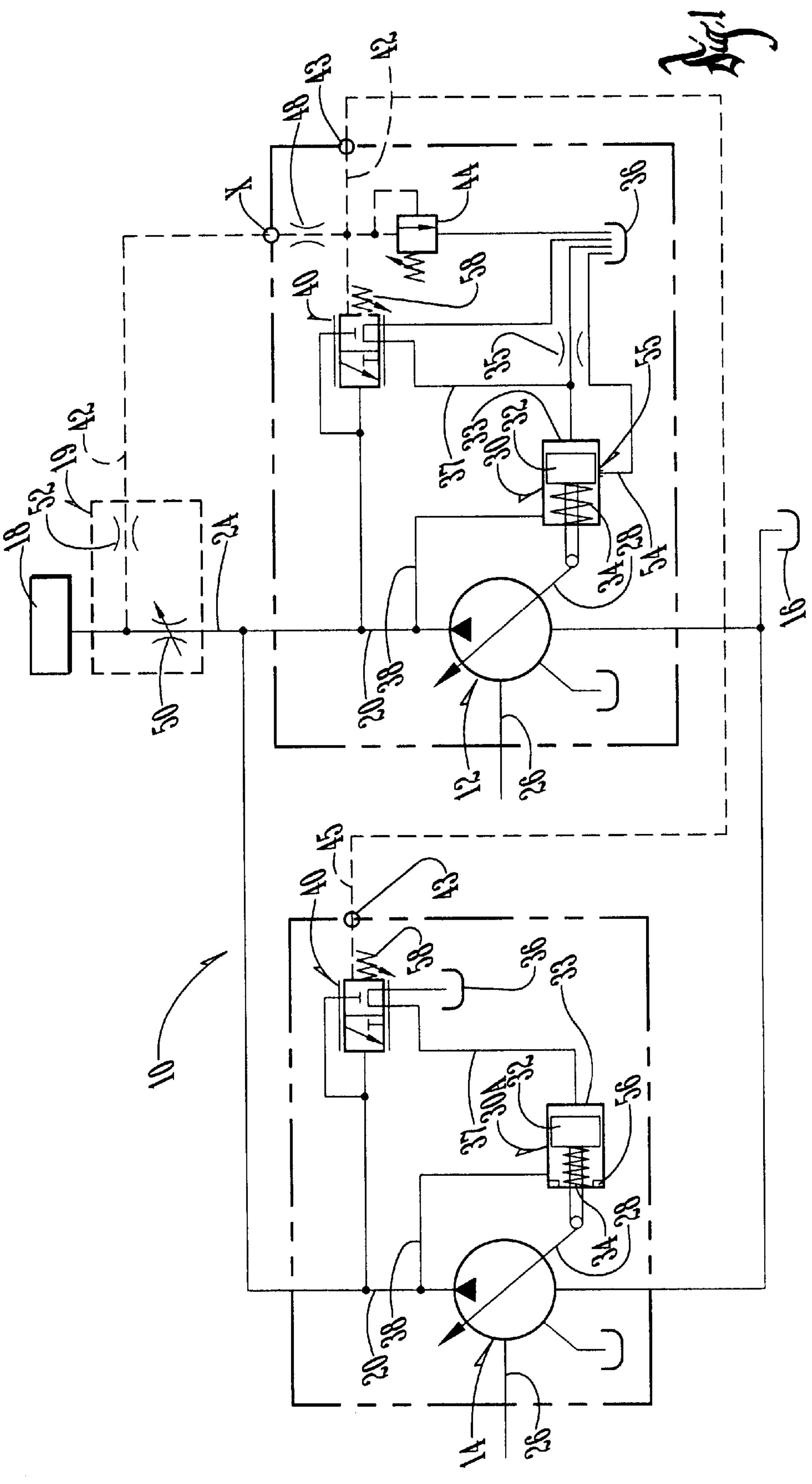
FIG. 1 is a hydraulic schematic diagram depicting the ganged pump system of the present invention.

The ganged pump apparatus or system of the present invention is generally denoted by the reference numeral in FIG. 1. Generally, similar features have similar numeric references in the drawings and the description which follows.

The ganged pump system 10 includes two interconnected variable displacement open circuit pumps, 12 and 14 (on the right and left respectively in FIG. 1). The terms first and second pumps are also applied to the pumps 12 and 14 respectively herein. The pumps 12 and 14 draw hydraulic fluid from a reservoir 16. The pumps 12 and 14 pressurize the fluid and deliver it through respective output lines 20 to a common output line 24 connected thereto. The common output line 24 is connected through flow control valve 19 to a load 18, where work can be done.

Each of the pumps 12 and 14 has a respective input shaft 26. The input shafts can be driven separately, as shown, or can be coupled together in a tandem configuration. The pumps 12 and 14 each include a displacement varying mechanism, for example a swashplate 28. The swashplates 28 tilt to vary the displacement of the respective pumps 12 and 14 by controlling the stroke of the axial pistons (not shown), as is well known in the art.

A servo actuator 30 is operatively connected to the swashplate 28 in pump 12 so as to tilt said swashplate 28 to various angles. The servo actuator 30 has a servo piston 32 disposed in a servo housing 33. The servo piston 32 is connected to the swashplate 28 and is normally urged toward maximum fluid displacement, or full pump stroke position by a spring 34. A similar, albeit slightly different, servo actuator 30A connects to pump 14.

Each of the pumps 12 and 14 has a respective case drain 36. Preferably, the case drains 36 are fluidly connected with the reservoir 16. Bias lines 38 are connected respectively to the output lines 20 and servo actuators 30 and 30A, and communicate pressurized fluid that urges the pumps to maximum fluid displacement.

Each of the pumps 12 and 14 has a load sensing control 40 respectively associated therewith. The load sensing controls 40 are adjustable pressure linearly movable spool type displacement control valves. The load sensing controls 40 have two terminal positions and three ports, or ways for fluid to enter or exit. Thus, they are referred to as two-position three-way valves in the art. Each of load sensing controls 40 has a first port fluidly connected to the output lines 20 of the respective pumps 12 and 14. The load sensing controls 40 have a second port fluidly connected respectively to the case drains 36, and a third port fluidly connected to the servo actuators 30 or 30A.

Figure 3:
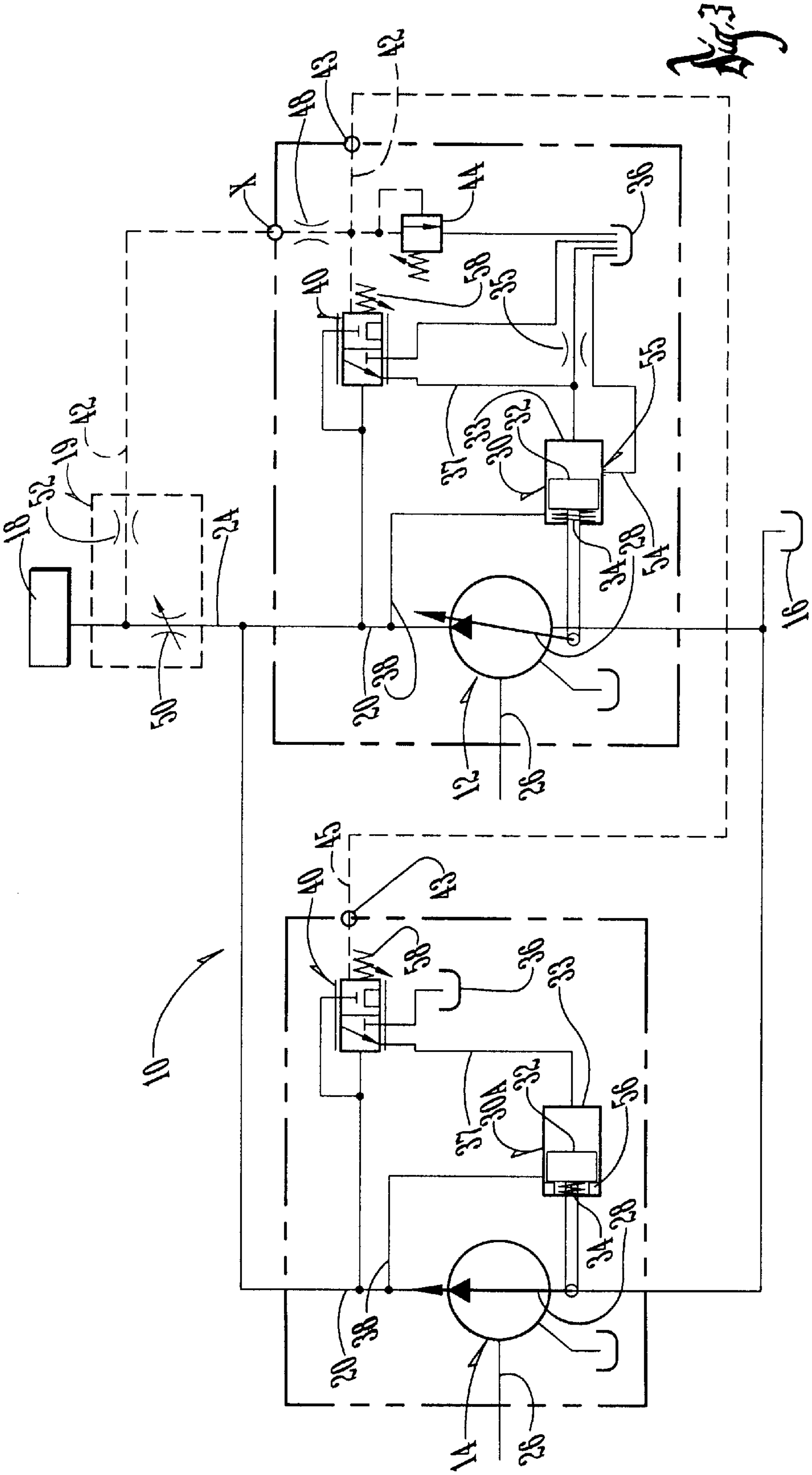
FIG. 3 is a hydraulic schematic diagram depicting the ganged pump system of the present invention showing the load sensing controls positioned to destroke the variable displacement pumps.

When load sensing controls 40 are operatively in the position shown in FIG. 1, servo pressure conduits 37 are connected to case drains 36 respectively. This condition allows springs 34, in concert with bias pressure supplied through bias lines 38 to urge swashplates 28 into stroke, increasing the fluid displacement and flow output of pumps 12 14. In the other terminal position of the load sensing controls 40 as shown in FIG. 3, the output lines 20 are connected with the servo controls 30 respectively. In this mode, the servo pistons 32 overcome the combination of bias pressure and springs 34, thereby tilting swashplates 28 out of stroke, thus decreasing the fluid displacement and flow output of pumps 12 and 14.

The load sensing controls 40 modulate between the terminal positions so as to control the fluid displacement and output flow of the pump to the rate required for maintaining a constant pressure drop across the flow control valve 19. Flow control valve 19 has been simply represented as a variable orifice 50, with a pilot signal line 42 exiting through a fixed orifice 52 to the load sensing port "X" of the first pump 12. For reasons discussed further below, the load sensing control 40 in pump 14 is set at a value lower than the load sensing control 40 in pump 12.

Turning now to the first pump 12, a single pilot signal line 42 connects the load 18 with the load sensing control 40. The pilot signal line 42 also connects the load 18 and the load sensing control 40 to an adjustable pressure compensating pilot valve 44. A pilot signal line 45 connects the pilot signal line 42 to the load sensing control 40 in the second pump 14. For example, an external hose can be connected to remote pressure compensation ports 43 on pumps 12 and 14, or an internally ported conduit could provide this communication passage internally.

The load sensing control 40 associated with the second pump 14 is connected in much the same way as the load sensing control 40 of the first pump 12. However, the second pump 14 does not require a pressure compensating pilot valve. Instead, the pressure compensating pilot valve 44 in the first pump 12 controls both pumps 12 and 14.

Another difference between the first and second pumps 12 and 14 is that the servo actuator 30 of the first pump 12 is allowed to go over-center, whereas the servo actuator 30A in the second pump 14 is not. Thus, the servo actuator 30 can move the swashplate 28 such that positive displacement, zero displacement (neutral), or negative displacement, as illustrated in FIG. 3, is possible from pump 12. When swashplate 28 is set for negative displacement, the pump 12 actually functions similar to a motor, by consuming rather than supplying fluid flow. This allows the first pump 12 to handle any transient flow conditions which might occur when the flow is abruptly reduced or stopped.

Furthermore, a drain passage 54 extends through the servo housing 33 associated with the first pump 12. This passage selectively connects to the case drain 36 whenever the servo piston 32 uncovers the passage 54. Thus, the drain passage 54 comprises one embodiment of a simple two-way, two-position valve. The position of the servo piston 32 relative to the drain passage defines an over-center valve 55. The drain passage 54 in the servo housing 33 routes servo fluid to the case drain 36. The servo actuator 30A of the second pump 14 does not require such a passage.

Preferably the first pump 12 is only allowed to go about three degrees over-center in terms of swashplate angle. The over-center condition allows the first pump 12 to handle (consume) compressed oil from the load circuit. In addition, the over-center valve 55 dumps servo fluid to case drain 36 when the-pump 12 goes over-center, which greatly dampens the system during a transient change in the flow or flow command that causes the pump to destroke. When the swashplate 28 of pump 12 goes over-center, as shown in FIG. 3, the over-center valve 55 meters servo flow to case drain 36. This feature greatly reduces overshoot in system variables as well as enhancing the stability characteristics of the system.

On the other hand, the servo actuator 30A of the second pump 14 includes a zero degree stop 56 which prevents the pump 14 from going over-center. Alternatively, the stop 56 could be located within the pump 14 to limit the movement of its swashplate. Thus, the stop member is operatively connected to the displacement varying mechanism (swashplate 28) and establishes the minimum flow of the pump 14 to a non-negative value.

A variety of fixed and variable orifices are provided throughout the circuit to provide effective and stable control. An orifice 48 is provided in the pilot signal line 42 downstream of the load sensing port "X", and works in conjunction with the pressure compensating pilot valve 44 to minimize parasitic loss attributable to pilot flow, and to fulfill the need to uncouple load pressure from pilot pressure during pressure compensating pilot valve operation. The load 18 has a flow control valve 19 with a variable orifice 50, where the common output line 24 connects with the load 18. The flow control valve 19 also has a fixed orifice 52 on the pilot signal line 42 which is connected to the common output line 24 between the variable orifice 50 and the load 18.

Preferably, the pumps 12 and 14 have casings or housings, as indicated by the long and double short dashed lines, which enclose the various components. However, it is contemplated that either of the load sensing controls 40, and even the pressure compensating pilot valve 44, could be mounted remote from the pump housings.

In operation, if no flow is being commanded by the operator, variable orifice 50 is closed, pump flow is blocked and pilot signal line 42 is drained to reservoir 16. The load sensing controls 40, while sensing pressure in output lines 20 and no pressure in pilot signal lines 42 and 45, will supply pressurized fluid to servo controls 30 and 30A resulting in pump pressure equivalent to the higher of the force in springs 58. This condition is generally referred to as low pressure standby in systems of this type, when there is no flow and pressure is limited to the load sensing control setting.

When flow is required to be supplied to load 18, variable orifice 50 is opened to allow the desired rate of flow. As fluid flows through variable orifice 50, a pressure differential is generated across the orifice. The pressure differential across the orifice varies in relation to the flow through the orifice 50.

The relationship between flow and pressure differential is defined by the general orifice equation:

$$Q = C_D * A\sqrt{\frac{2P}{\rho}}$$

where:

Q=the volumetric flow through the orifice expressed in $\text{inches}^3/\text{second}$ $C_D$=the orifice discharge coefficient (no units)

A=the area of the orifice in $\text{inches}^2$

P=the fluid pressure drop across the orifice expressed in pounds force per square inch (psi)

ρ=the fluid mass density expressed in $$\frac{\text{pounds force} * \text{seconds}^2}{\text{inches}^4}$$

For oil, $C_D$ is approximately 0.63 and ρ is approximately $8\times10^{-5}$ $\text{lbf*sec}^2/\text{in}^4$. These values can be substituted into the above equation, which can be simplified and rewritten to enable one to solve for the fluid pressure drop across the orifice. Thus, the fluid pressure drop P or ΔP=

$$\Delta P = \left(\frac{Q}{100A}\right)^2$$

when the fluid is hydraulic oil.

Thus for each given rate of flow, a unique pressure differential will exist. The function of the load sensing controls 40 is to adjust pump output flow to maintain a constant pressure differential across variable orifice 50, thereby maintaining a constant rate of flow, as commanded by the operator.

Initially, when variable orifice 50 is opened to supply fluid flow to load 18, load sensing controls 40 will experience pressure signals from their respective output lines 20 from pilot signal lines 42 and 45. Because load sensing control 40 in pump 12 is set at a higher value than load sensing control 40 in pump 14, pump 12 responds first to provide the flow commanded by flow control valve 19. As described earlier, the load sensing control 40 in the first pump 12 will continuously modulate control pressure to servo actuator 30 so that pump 12 will provide a constant fluid flow to load 18 as commanded by variable orifice 50. When the system operator commands a change in flow by further opening or closing variable orifice 50, load sensing control 40 will subsequently sense a change in the pressure differential across variable orifice 50. Control 40 responds by altering the flow of pressurized control fluid through servo pressure conduit 37, causing a corresponding change in the position of swashplate 28 in pump 12, thereby bringing the fluid output of pump 12 into equilibrium with the commanded flow of valve 19.

As an operator continues to increase flow to the load 18, the demanded flow may reach a level that is beyond the flow capacity of single pump 12. When this level of demand is reached, load sensing control 40 in the first pump circuit can no longer maintain equilibrium between the pressure differential across the variable orifice 50 and the setting of spring 58. The resulting drop of fluid pressure in the pilot signal pressure in line 42 is communicated to load sensing control 40 in the second pump circuit through pilot signal line 45. At this condition, the load sensing control 40 in pump 14 begins to modulate pressurized servo control flow through servo pressure conduit 37 to servo actuator 30A. This sequence causes pump 14 to adjust its fluid displacement so that in combination with pump 12 the combined flow output matches the flow required by flow control valve 19.

Figure 2:
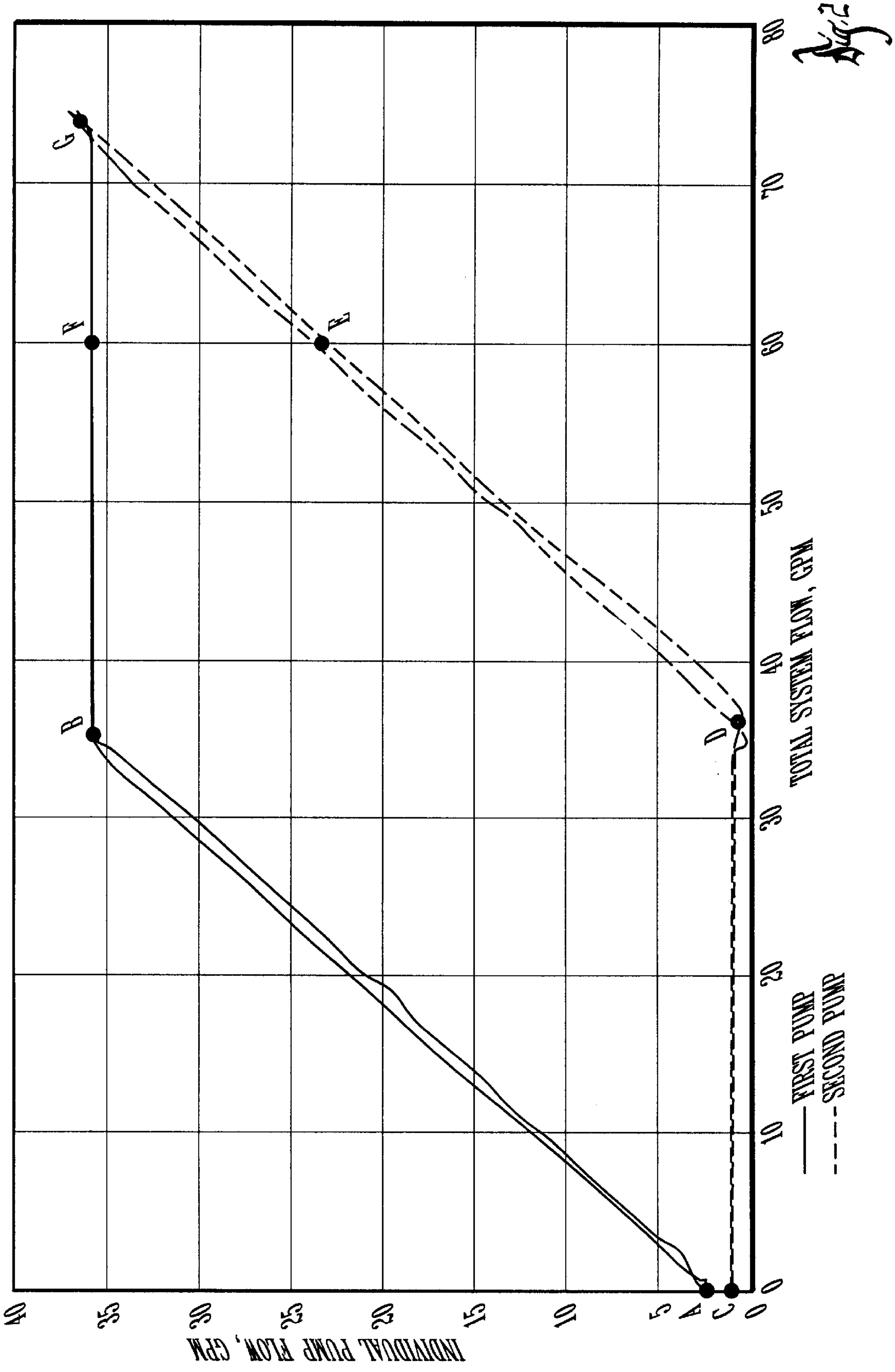
FIG. 2 is a typical graph of total system flow versus individual pump flow possible with the present invention.

As illustrated in FIG. 2, the flow regime of this ganged pump system 10 is such that first pump 12 supplies flow requirements until reaching its maximum fluid displacement capability, whereupon second pump 14 supplies additional flow requirements until both pumps may be at their maximum fluid displacement capabilities. Conversely, as flow requirements are reduced by closing variable orifice 50, second pump 14 will reduce its fluid displacement until arriving at zero displacement (no flow output), whereupon first pump 12 will reduce its fluid displacement until arriving at zero displacement, thereby bringing the total flow output of the ganged pump system 10 to zero.

All the while that flow demand may be changing as the system operator varies flow control valve 19, the combination of load sensing controls 40 in the pumps 12, 14 continuously function to maintain equilibrium between the pressure differential across variable orifice 50 and the settings of the respective springs 58.

On the occasion that a reduction in commanded flow is so abrupt that the pumps 12 and 14 may not be able to reduce their fluid displacement quickly enough to maintain stable pressure through the system, excessive compressed fluid may remain in the hydraulic circuit of the ganged pump system 10 through common output line 24. This condition is absorbed by the over-center operation of pump 12 as previously described, allowing pump 12 to consume this transient, reverse flow until stable no-flow operation is achieved. During this transient flow operation the differential between the settings of springs 58 again becomes significant, in that pump 14 is prevented from attempting to increase its fluid displacement and unnecessarily supplying positive flow to pump 12 while it is in a negative fluid displacement, consuming flow. This allows the ganged pumping system 10 to ultimately achieve a stable, no-flow operating condition when variable orifice 50 is closed, commanding zero flow to the load.

A Series 45 tandem pump was modified according to the present invention in order to generate the data shown in FIG. 2. The figure displays how pump 12 is stroked from standby condition A until it reaches maximum fluid displacement or flow at B. Then pump 14 is stroked from standby condition C–D to provide additional flow up until total maximum combined flow is achieved at point G. The dual lines that are plotted for segments A–B and D–G are representative of the control hysteresis between the stroking and destroking modes. This ganged pump system is available from Sauer-Sundstrand Co., 2800 E. $13^{th}$ Street, Ames, Iowa, U.S.A., however the invention is not limited to these particular open circuit units.

Thus, the invention provides a method of phasing a plurality of open circuit pumps. The steps of the method include providing first and second variable displacement open circuit pumps, each controlled by respective adjustable first and second load sensing controls to produce respective output flows; joining the respective output flow into a single flow connected to the load; controlling the first and second servo actuators based upon a pressure signal from a single pressure compensating pilot valve connected to the load; limiting the displacement of the second pump to a non-negative value while allowing the displacement of the first pump to reach a negative value; and setting the adjustable second load sensing control in the second pump to a lower setting than the first load sensing control such that the second pump is phased with the first pump and thereby will not provide positive fluid displacement flow to the first pump as the first pump passes the zero displacement condition and assumes a negative displacement.

Because the first and second load sensing displacement control valves 40 are each adjustable due to the adjustable springs 58, they can be set to respond at different pressure settings. For example, the second load sensing displacement control valve 40 in pump 14 can be set four bar lower than the first load sensing displacement control valve 40 in pump 12 so that the control 40 commands the second pump 14 to deliver additional flow to the load 18 when first pump 12 is operating at its maximum displacement and demand for increased flow through variable orifice 50 results in a four bar drop in pressure across variable orifice 50 which is communicated to valve 40 through pilot signal line 45. Thus, the outputs of the pumps 12 and 14 are phased by this pressure setting differential so that they deliver fluid to the load 18 in a predetermined and coordinated manner. The phasing can be seen in FIG. 2 where point D is slightly to the right of point B and there is a slight delay in the increase in total system flow. Of course, various pressure setting differentials other than four bar can be accomplished by adjusting the respective displacement control valves 40 through the springs 58.

The present invention reduces the number of components in ganged pumps and therefore reduces cost. The second pump 14 is not required to have the following: the over-center valve; the pressure compensating pilot valve; and various orifices for tuning the system. For convenience, all orifices for tuning the system are located in the first pump 12.

It should be understood that the logic of the present invention can be extended to three or more pumps ganged together. The pump flows can also be overlapped, phased or sequenced.

Therefore, it can be seen that the invention at least accomplishes its stated objectives.

What is claimed is:

1. A ganged pumping apparatus, comprising:

first and second open circuit pumps having respective output lines joined by a common line connected to a load, each of the pumps having a respective standby condition of minimum steady state displacement;

a first load sensing displacement control valve connected to the output line of the first open circuit pump;

a second load sensing displacement control valve connected to the output line of the second open circuit pump;

a pressure compensating pilot valve;

a pilot signal line connected to the load, the pilot valve, and the first and second load sensing displacement control valves;

a first servo actuator operatively connected with the first pump and the first load sensing displacement control valve, and having an over-center valve connected thereto;

a second servo actuator operatively connected to the second pump and the second load sensing displacement control valve;

each of the first and second load sensing displacement control valves having two positions, one position wherein the respective actuator is commanded to reduce the fluid displacement of the respective pump and the other position wherein the respective actuator is commanded to increase the fluid displacement of the respective pump.

2. A ganged pumping apparatus, comprising:

a variable displacement open circuit first pump for drawing fluid from a reservoir and displacing a pressurized output flow of the fluid through a first output line to a load;

a first displacement varying mechanism in the first pump;

an over-center servo actuator operatively connected to the first displacement varying mechanism so as to control the displacement of the first pump between a maximum output flow and a minimum output flow less than zero;

a pressure compensating pilot valve connected to the load with a pilot signal line;

a first displacement control valve fluidly connected to the output flow of the first pump and the pilot signal line connected to the load and the pressure compensated pilot valve so as to generate a first command signal to the over-center servo actuator and thereby to the first displacement varying mechanism in the first pump based upon a pilot signal from the load and the pressure compensating pilot valve;

a variable displacement open circuit second pump for drawing fluid from the reservoir and displacing a pressurized output flow of the fluid through a second output line which is fluidly joined to the first output line in a common output line upstream of the load;

a second displacement varying mechanism in the second pump;

a servo actuator operatively connected to the mechanism in the second pump so as to control the displacement of the second pump between a maximum output flow and a minimum output flow; and a second displacement control valve fluidly connected to the output flow of the second pump and the pilot signal line connected to the load and the pressure compensating pilot valve to generate a second command signal which is phased offset from and substantially parallel to the first command signal.

3. The apparatus of claim 2 wherein a stop member is operatively connected to the second displacement varying mechanism in the second pump for establishing the minimum output flow to a non-negative value.

4. The apparatus of claim 3 wherein the first displacement control valve is load sensing.

5. The apparatus of claim 3 wherein the second displacement control valve is adjustable and has a setting lower than the first displacement valve.

6. The apparatus of claim 3 wherein the second displacement control valve is adjustable and has a setting approximately four bar lower than the first displacement control valve such that the second pump is phased approximately four bar lower than the first pump.

7. The apparatus of claim 3 wherein the second displacement control valve is an externally adjustable three way, two position spool valve.

8. The apparatus of claim 3 wherein the first and second displacement varying mechanisms each comprise a tiltable swashplate.

9. The apparatus of claim 3 further comprising a stop member disposed in the servo actuator of the second pump for preventing the second pump from achieving a negative displacement.

10. The apparatus of claim 3 wherein the first pump has a fluid containing casing therearound, a line having an orifice therein fluidly connects the first displacement control valve to the casing.

11. The apparatus of claim 3 wherein the first and second pumps each have a separately driven shaft.

12. The apparatus of claim 3 wherein the pressure compensating pilot valve is a pressure relief valve that has an adjustable pressure setting.

13. The apparatus of claim 3 wherein the first displacement control valve is an adjustable pressure displacement control valve.

14. A method of phasing a plurality of open circuit pumps, comprising:

providing first and second variable displacement open circuit pumps each controlled by respective adjustable first and second load sensing displacement control valves to produce respective output flows;

joining the respective output flows into a single flow upstream of a load;

controlling the first and second load sensing displacement control valves based upon a pressure signal from a single pressure compensating pilot valve connected to the load;

limiting the fluid displacement of the second pump to a non-negative value while allowing the displacement of the first pump to reach a negative value;

limiting the fluid displacement of the second pump to a non-negative value while allowing the displacement of the first pump to reach a negative value;

setting the adjustable second load sensing displacement control valve in the second pump to a different pressure setting than the adjustable first load sensing displacement control valve such that the second pump is phased with the first pump and thereby is held at the zero displacement condition while the first pump passes the zero displacement condition and assumes a negative displacement condition.

15. The method of claim 14 comprising setting the second displacement control valve to a lower pressure setting than the first displacement control valve.

16. The method of claim 15 comprising setting the second displacement control valve to a setting four bar lower than the first displacement control valve.

17. A ganged pumping apparatus, comprising:

a variable displacement open circuit first pump for drawing fluid from a reservoir and having an output line connected to a load for displacing pressurized fluid toward the load;

a first displacement varying mechanism in the first pump;

an over-center servo actuator operatively connected to the first displacement varying mechanism so as to control the displacement of the first pump between a maximum output flow and a minimum output flow;

a pressure compensating pilot valve connected to the load with a pilot signal line;

a first displacement control valve fluidly connected to the output flow of the first pump and the pilot signal line connected to the load and to the pilot valve, to generate a pilot signal from the load and the pressure compensating pilot valve;

to provide a first command signal to the over-center servo actuator and thereby to the first displacement control varying mechanism in the first pump;

a variable displacement open circuit second pump for drawing fluid from the reservoir and for displacing a pressurized output flow of the fluid through a second output line which is fluidly joined to the first output line in a common output line upstream of the load;

a second displacement varying mechanism in the second pump;

a servo actuator operatively connected to the second displacement varying mechanism in the second pump to control the fluid displacement of the second pump between a maximum output flow and a minimum output flow; and a second displacement control valve fluidly connected to the output flow of the second pump and the pilot signal line connected to the load and the pressure compensating pilot valve to generate a second command signal which is out of phase with said first command signal.

18. The apparatus of claim 17 further comprising an adjustable orifice disposed immediately upstream of the load.

* * * * *

UNITED STATES PATENT AND TRADEMARK OFFICE
CERTIFICATE OF CORRECTION

PATENT NO. : 6,109,030
DATED : August 29, 2000
INVENTOR(S) : Kerry G. Geringer

It is certified that error appears in the above-identified patent and that said Letters Patent are hereby corrected as shown below:

Column 9, line 19, strike the numeral "3" and insert - 2 -.

Column 9, line 21, strike the numeral "3" and insert - 2 -.

Column 9, line 24, strike the numeral "3" and insert - 2 -.

Column 9, line 29, strike the numeral "3" and insert - 2 -.

Column 9, line 32, strike the numeral "3" and insert - 2 -.

Column 9, line 35, strike the numeral "3" and insert - 2 -.

Column 9, line 39, strike the numeral "3" and insert - 2 -.

Column 9, line 43, strike the numeral "3" and insert - 2 -.

Column 9, line 45, strike the numeral "3" and insert - 2 -.

Column 9, line 48, strike the numeral "3" and insert - 2 -.

Column 10, delete lines 4, 5 and 6.

Signed and Sealed this

Twenty-fourth Day of April, 2001

*Attest:*

NICHOLAS P. GODICI

*Attesting Officer*

*Acting Director of the United States Patent and Trademark Office*